F. GAUTZSCH, Jr.
FENDER.
APPLICATION FILED MAR. 5, 1910.

962,754.

Patented June 28, 1910.

Witnesses

Inventor
F. Gautzsch, Jr.
by Benj. R. Catlin
Attorney

UNITED STATES PATENT OFFICE.

FRED GAUTZSCH, JR., OF PHILADELPHIA, PENNSYLVANIA.

FENDER.

962,754.  Specification of Letters Patent.   Patented June 28, 1910.

Application filed March 5, 1910. Serial No. 547,556.

*To all whom it may concern:*

Be it known that I, FRED GAUTZSCH, Jr., a resident of Philadelphia, in the county of Philadelphia and State of Pennsylvania, have invented certain new and useful Improvements in Fenders; and I do hereby declare the following to be a full, clear, and exact description of the invention, such as will enable others skilled in the art to which it pertains to make and use the same.

This invention relates to fenders for cars or other vehicles and mounted on the front end thereof, and suitably operated to pick up or catch obstacles, as persons, in the way on the track, to prevent the wheels reaching or passing over them.

The object of the invention is to provide a device of the character indicated, simple, economical to construct, and certain in operation, the main operating parts being exposed and easily accessible and not liable to get out of order.

The invention consists in the construction hereinafter described and particularly pointed out in the claims.

Figure 1:
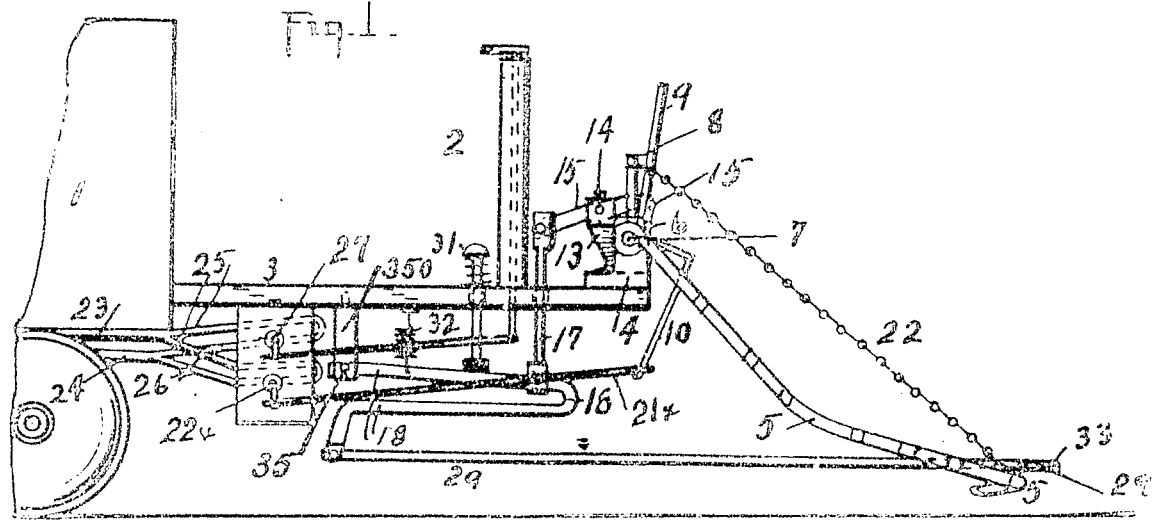
Figure 2:
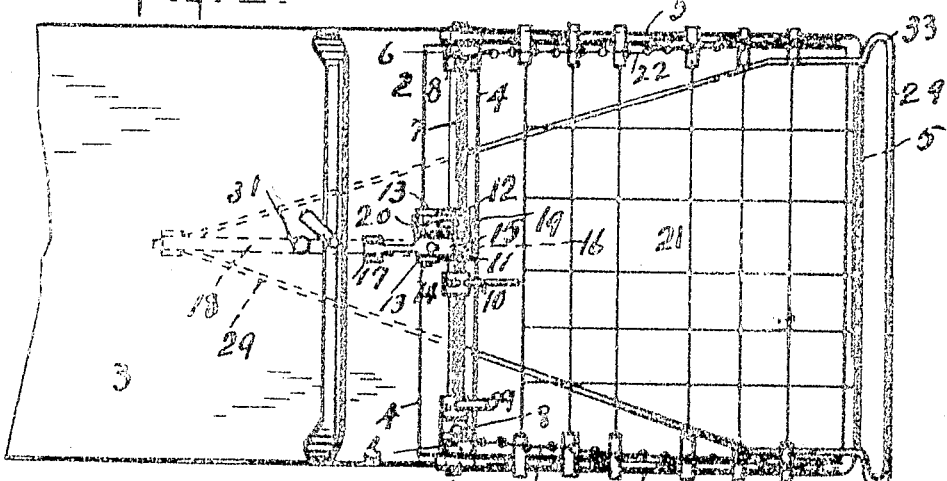
Figure 3:
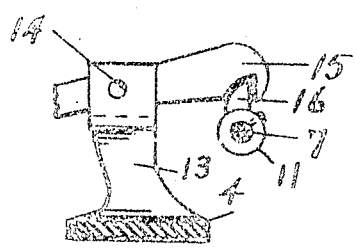
Figure 4:
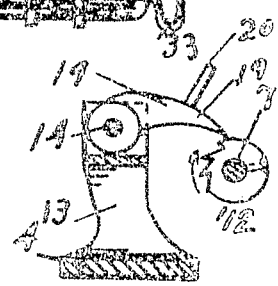

In the accompanying drawing which illustrates the invention and forms part of the specification,—Figure 1 is a side view of the apparatus on a car; Fig. 2 is a plan view of the same; Figs. 3 and 4 are sections showing details.

In the drawing numeral 1 denotes a vehicle, for example, a street car, and 2 the front or dash-board end of the car, and 3 the car floor, which as shown extends forward a little to form a fender-bracket-supporting-shelf at the point stated. Numeral 4 indicates said bracket, which preferably is about as long as the width of the fender 5, and has end bearing posts 6 for a transverse shaft 7 on which are mounted, so as to turn therewith, the fender 5, chain-posts 8, resetting post 9, brake-valve-operating device 10 and a fender-supporting-lock member 11, and a dropped-fender-lock-member 12, all fixed to turn with the shaft, screws being shown for the purpose of securing the lock members 11 and 12 to the shaft 7.

The bracket 4 is preferably cast, and at or near its middle is an integral post 13 which may extend a little above the shaft, and has a yoke for the trunnion 14 of a fender-releasing pawl 15, which normally engages a lug 16 on the lock-member 11, and which at the opposite end is connected to rod 17 which passes through a hole in the floor and is connected to an angle lever 18. On the same trunnion within the yoke is a loose pawl 19 the end of which bears on the lock-member 12, which member has one or more lugs, notches or teeth brought under the end of the pawl as the fender drops. Said pawl has a handle 20.

The fender 5 comprises a U-shape frame secured to shaft 7, and a rope netting 21 between the fender sides. From the chain-posts chains 22 extend to the outer portion of the fender. The handle or resetting post is secured in such position that when the fender is down it will be within reach of the motorman on the platform, and by pulling it (after first raising pawl 19 by handle 20) he can raise the fender until lug 16 is engaged by pawl 15 which will hold up the fender. The resetting-post 9 is shown as sleeved to the shaft, and this is preferred since it can be adjusted to the most convenient part of the shaft to suit different cars or operators.

The brake-valve-operating device 10 is an angle or bent arm, and preferably separately adjustable on the shaft, as shown, though it may instead be connected to the same sleeve as lug 16, but would then not be separately adjustable. The lower end of lever 10 is connected to a rod 21˟ which is connected to a valve rod 22˟ the operation of which controls any suitable pressure or vacuum brake (not shown). 23 denotes a pipe extending from the brake-air tank or device, and 24 the pipe extending to the brake apparatus. These pipes are connected by branch pipes 25, 26, in one of which is a valve and stem 27 under control of the motorman, and in the other is a valve and stem 22˟ to which rod 21˟ connects as stated, so that when either valve is operated the brake is applied.

Numeral 29 denotes a trigger-frame which extends a little in advance of the fender and is connected to the power-end of the angle lever 18 under the car floor in manner to operate the releasing pawl 15 when said frame strikes an obstruction and is pushed rearwardly. Said lever 18 is preferably of "goose-neck" shape, with two sides or members substantially parallel with the car floor, one end being pivoted at 35 to a fixed post 350, and the other end being pivotally connected to the trigger-frame at 36. The lower or return end of the lever through which power is applied can yield when pressure on the trigger-frame is not exactly parallel with the longitudinal axis of the car.

The motorman on the car can drop the fender by the pedal 31. A contractile spring to assist in raising the lever 18 is denoted by 32. The front of the fender has lugs or devices to keep the fender body off of the pavement; and the trigger-frame has integral side projections 33 to make said frame as wide as the fender. The sides of the trigger-frame extend between the sides of the fender, and projections 33 make it impossible for the frame to drop below the fender accidentally, even if pushed back beyond the front of the fender.

Having thus described the invention, what I claim and desire to secure by Letters Patent is:—

1. The combination with a vehicle, of a fender, a shaft extending across the front of the vehicle and on which the fender is supported, a lock-member having a lug fixed on said shaft, a pawl normally engaging said lug to hold the fender up, a lever operatively connected to said pawl, a part actuated by striking an obstacle connected to said lever to disengage said pawl permitting the fender to drop, a ratchet wheel fixed on the same shaft, and a ratchet in position to engage said wheel as the fender drops to hold the fender down.

2. The combination with a vehicle, of a fender, a shaft extending across the front of the vehicle and on which the fender is supported, a lock-member having a lug fixed on said shaft, a pawl normally engaging said lug to hold the fender up, a lever of goose-neck shape pivoted at one end, an operating connection between said pawl and lever, and a part actuated by striking an obstacle connected to the other end of said lever to actuate it and to disengage said pawl.

3. The combination with a vehicle, of a fender, a fender shaft, a lug fixed on said shaft, a pivoted pawl engaging said lug to hold the fender up, a goose-neck lever having two members substantially parallel with the vehicle floor, the upper member being pivotally supported from said floor, the lower return member being operatively connected to a device adapted to be pushed backwardly upon striking an obstruction, said device, and a link connecting the pawl and lever.

4. The combination with a vehicle, of a fender, a fender-shaft extending across the vehicle, a lug fixed on the shaft, a pivoted pawl engaging the lug, a goose-neck lever pivotally supported below the vehicle floor, a device in front of the fender and adapted to be moved by striking an obstruction, and connected to the free end of the goose-neck lever, an operating connection between said lever and pawl, a ratchet wheel fixed on the same shaft, and a second pawl adapted to engage said wheel as the fender drops to hold the fender down.

5. The combination with a vehicle, of a fender, a bracket extending across the vehicle and having journal posts at its ends, and an intermediate post, a fender shaft journaled in the end posts, a pawl pivoted in the intermediate post, a lug secured to the shaft and engaged by said pawl, a trigger-frame, and devices operatively connecting said frame and pawl.

6. The combination with a vehicle, of a fender, a fender shaft, a fender-raising handle fixed to the shaft and within reach of an operator on the vehicle, a lug fixed on the shaft, a fender-supporting pawl engaging the lug, a ratchet wheel also fixed on the same shaft, a second pawl adapted to engage the wheel as the fender drops, a brake controlling arm also fixed to said shaft, and means operated by striking an obstruction to disengage the first mentioned pawl.

In testimony whereof, I have signed this specification in the presence of two subscribing witnesses.

FRED GAUTZSCH, Jr.

Witnesses:
H. M. McCAUGHEY,
Jos. W. MILLS.